June 29, 1926.

A. SIMONS

SPRING

Filed June 26, 1924

1,590,211

INVENTOR
Aaron Simons
BY
Dean Fairbank Obright & Hirsch
ATTORNEYS

Patented June 29, 1926.

1,590,211

UNITED STATES PATENT OFFICE.

AARON SIMONS, OF NEW YORK, N. Y.

SPRING.

Application filed June 26, 1924. Serial No. 722,428.

This invention is an improved resilient connection for a pair of relatively movable bodies for yieldingly resisting such relative movement, and is particularly applicable for use in supporting one of the bodies from the other. I have in mind as a most common use of a simple and preferred form, the supporting of a chassis from the axles of the vehicle.

The invention includes broadly, a wavy or sinuous element connected to the bodies and resiliently opposing a straightening by endwise pull, and means for translating relative movement of the bodies into a substantially endwise pull on the resilient member.

More specifically the invention may include a pair of resilient connecting members both fixed to the two movable elements, one member being in the nature of a spring bar while the other member is in the nature of a corrugated, sinuous or wavy spring bar. The two members are connected rigidly together at both ends, whereby force applied at either end will tend to flex the spring bar and either extend or contract the wavy spring bar. Flexing of the combined springs is opposed by the resistance of the wavy spring to extension or contraction, and also by the resistance of both springs to bodily bending.

By means of my invention I am able to secure the desired yielding resistance by the use of a very much smaller number of spring elements than is commonly required for accomplishing the same result. For instance by a single flat leaf spring and a single wavy or corrugated spring of the same cross-sectional form as the ordinary vehicle spring leaves, I can secure as great resistance as is commonly secured by the use of four or five leaves of varying lengths. This is because of the high resistance encountered in straightening the leaf by endwise pull on it, as compared to the resistance offered to merely bending the leaf.

In the preferred embodiment when used for purposes of vehicle suspension, I utilize a wavy spring and a flat spring rigidly connected together at both ends and secured to a support intermediate of the ends. The intermediate support may be the axle of a vehicle, while the weight of the chassis may rest upon the opposite ends of the springs. A double action will occur whenever the vehicle passes over a bump or obstruction in the road. The intermediate portion of the spring moving upwardly relative to the connected ends thereof will flex the flat spring, and will both flex and extend the wavy spring. The reflex action of the flat spring will be checked by the opposition of the wavy spring to any compression tending to shorten the same beyond its normal effective length. Preferably clips are provided at spaced points along the spring to hold the two spring elements together and limit their relative separation so that the flat spring will not be bowed or buckled away from the wavy spring either by the original shock of impact or upon the rebound.

Figure 1:
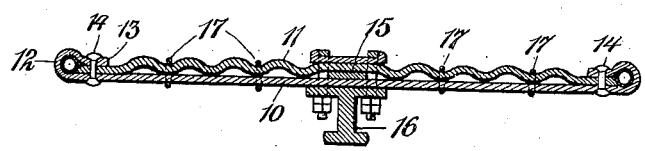
Fig. 1 is an edge view of one form of my improved spring.
Figure 2:
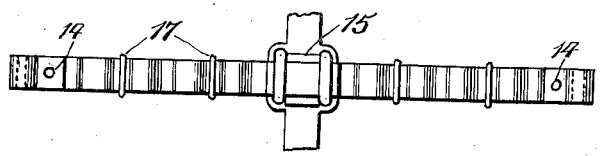
Fig. 2 is a plan view thereof.

In the construction illustrated in Figs. 1 and 2 the spring is made up of a flat leaf 10 and a wavy corrugated or sinuous leaf 11, the two being in superposed relationship with the wavy or corrugated leaf on the side which tends to take a convex form under load. The two leaves are rigidly connected together at their opposite ends and are so designed as to facilitate ready connection of the usual shackles or spring bolts of the ordinary vehicle. For instance the flat spring 10 may have its ends bent around to form closed loops 12 with the extremities spaced from the body of the leaf to receive the extremities of the corrugated leaf therebetween, and the three superposed parts rigidly connected together, as for instance by means of rivets 14. The intermediate portions of the two superposed leaves may be secured together if desired, or may be merely spaced by a plate 15 and the two fastened to the vehicle axle 16 by the usual form of spring clamp.

The upper or corrugated leaf comes into direct contact with the straight leaf at each corrugation and at any or all of these points of contact the two leaves may be secured together by clips 17 to prevent separation of the two leaves. These prevent any independent bending or buckling of the two leaves.

In operation the leaf 10 serves the usual function of a leaf spring in that it resists bending movement, but it also serves for translating the relative movement of the chassis and axle and the bending of the corrugated leaf into longitudinal strain on said corrugated leaf. The downward movement of the two ends of the spring during the bending of the spring will increase the linear distance along the upper side of the spring from one looped end to the other, and this increase in linear distance is yieldingly opposed by the resistance offered by the corrugated leaf to an elongation of the latter. This resistance is comparatively high and is equal to the resistance offered by a plurality of leaves subjected to mere bending strains. Furthermore there is no sliding movement of one leaf on the other as the elongation of the corrugated leaf takes place uniformly along the length thereof as each corrugation is slightly flattened by the stretching or elongation. Thus it is not necessary to provide any lubrication between the leaves, as is common with ordinary multiple leaf springs. During the rebound after the spring returns past normal position from being flexed, a high resistance is offered by the corrugated or wavy leaf due to the fact that such rebound causes a reduction in the linear distance between the ends along the upper side and a compression of the several loops or corrugations. The spring thus acts to cushion the rebound in a far more effective manner than is accomplished with the ordinary multiple leaf spring where only a single leaf is connected to the spring bolts at the ends and rebound is opposed by the resistance to the bending of only a single leaf after the vehicle body moves upwardly past normal position. As neither leaf can move independently of the other, and as there is no sliding movement during bending, two relatively light springs serve effectively even though neither of them is capable of resisting great bending strains. Due to the fact that the resistance to straightening movement by an endwise pull rapidly increases as corrugations flatten and approach straight line position, it is apparent that there is little or no danger of breaking a leaf by severe impact or excessive bending as no force to which the spring would ordinarily be subjected could possibly exert such a pull on the corrugated leaf as would break it in two.

Figure 3:
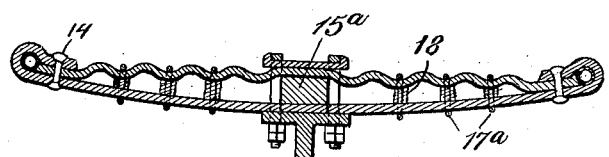
Figs. 3 and 4 are views similar to Figs. 1 and 2 respectively, and illustrating a second form.
Figure 4:
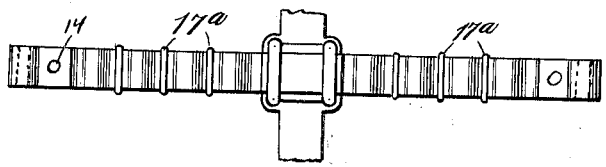

Although I have shown a spring supported intermediate of its ends and carrying load at its extremities, it will be apparent that the same results would be secured if the two leaves were rigidly secured together at the axle whereby each end section might operate independently of the other or in the absence of the other. It will be apparent that various results may be secured by varying the height and number of the corrugations, and also by varying the spacing of the two leaves at the support. The greater the spacing between the leaves at this point, the greater will be the endwise pull exerted on the corrugated leaf during a bending or swinging movement of the other leaf. In Figs. 3 and 4, I have shown a construction very similar to that shown in Figs. 1 and 2, except that the plate or spacing member 15ª is very much thicker than the member 15 shown in Fig. 1, and the clips 17ª hold the two leaves in definite spaced relationship, throughout their entire length except at the extremities and prevent relative movement of the two spring members toward and from each other. The spacers 18 of the clips are preferably of hard fiber. A construction such as shown in Figs. 3 and 4 is particularly adapted for heavy trucks or constructions where heavy loads are to be carried. The position of the flat leaf spring under normal load may be straight, as shown in Fig. 1, or may be slightly bowed, as in Fig. 3. The bowed construction is preferable where the two leaves are spaced, as it gives greater leverage in straightening pull on the corrugated leaf.

In the construction illustrated there is employed only a single corrugated or wavy element, as such constructions are designed primarily for resisting strain in one direction. If the spring be used in a machine or apparatus where it is called upon to resist equal bending strains in either direction from normal, there might be employed two of the corrugated leaves, one on each side of the flat leaf and one acting under tension and the other under compression during a movement in one direction, and with the reverse actions upon bending in the opposite direction.

I believe that the principle of my invention is broadly new and it will be apparent that a great variety of modifications might be made in the construction, arrangements of parts without departing from the spirit or scope of my invention as defined in the appended claims.

Having thus described my invention what I claim as new and desire to secure by Letters Patent is:

1. Means for cushioning the transmission of kinetic energy from one to the other of a pair of connected bodies comprising a curved spring member of substantially flat stock opposing resilient resistance to a straightening pull, said member being so connected to the bodies that relative movement of the bodies in one direction exerts longitudinal tension on said member tending to straighten the same.

2. Means for cushioning the transmission of kinetic energy from one to the other of a pair of connected bodies comprising a wavy spring member offering resilient resistance to a straightening pull, said member being so connected to the bodies that relative movement of the bodies in one direction exerts tension on the member tending to straighten the same.

3. Means for cushioning the transmission of kinetic energy from one to the other of a pair of connected bodies comprising a length of spring metal having a number of offset portions therein opposing resilient resistance to a straightening pull, said member being so connected to the bodies that relative movement of the bodies in one direction exerts tension on said member tending to straighten the same.

4. Means for cushioning the transmission of kinetic energy from one to the other of a pair of connected bodies comprising a transversely corrugated leaf spring so connected to the bodies that relative movement of the bodies in one direction exerts a longitudinal tensioning strain on the spring.

5. A spring suspension for vehicles comprising in combination a flat leaf spring and a wavy leaf spring having their ends rigidly connected to prevent relative longitudinal movement of said ends.

6. A spring suspension for a vehicle chassis including a flat leaf spring and a wavy leaf spring having their ends rigidly connected together to prevent relative longitudinal movement of said ends, the intermediate portions of said connected springs being adapted to be supported by the vehicle axle and the said connected springs being adapted to be connected to the chassis.

7. A spring suspension for a vehicle chassis including a flat leaf spring and a wavy leaf spring having their ends rigidly connected together, the intermediate portions of said connected springs being adapted to be connected to the chassis, and means associated with the springs for limiting the relative separation thereof.

8. A device of the character described in claim 7, and wherein said last mentioned means comprises clips encircling the springs.

9. A spring suspension for vehicles comprising a flat spring and a corrugated spring in superposed relationship, and secured together at two points spaced apart lengthwise of the springs to prevent relative longitudinal movement of the springs at said points.

10. A spring including a corrugated resilient leaf and a flat resilient leaf having their ends rigidly connected together to prevent relative longitudinal movement of the leaves at either end.

11. A spring suspension for vehicles including a corrugated leaf spring secured to the chassis and truck and means associated with such spring for causing relative movement of the chassis and truck in one direction to be translated into a tensioning pull on said spring tending to straighten the corrugations thereof.

12. The combination with a pair of connected bodies of means for cushioning the transmission of kinetic energy from one to the other including a corrugated spring element arranged in substantial parallelism with the bodies and disposed therebetween and means whereby relative movement of the bodies toward each other exerts a tensioning pull on the spring.

Signed at New York in the county of New York and State of New York this 21st day of June A. D. 1924.

AARON SIMONS.